United States Patent
Ehnes et al.

(10) Patent No.: US 7,350,442 B2
(45) Date of Patent: *Apr. 1, 2008

(54) CUTTING TOOL HAVING VARIABLE MOVEMENT IN A Z-DIRECTION LATERALLY ALONG A WORK PIECE FOR MAKING MICROSTRUCTURES

(75) Inventors: Dale L. Ehnes, Cotati, CA (US); Alan B. Campbell, Santa Rosa, CA (US); Daniel S. Wertz, Sebastopol, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/273,981

(22) Filed: Nov. 15, 2005

(65) Prior Publication Data

US 2007/0107567 A1    May 17, 2007

(51) Int. Cl.
*B23B 1/00* (2006.01)
(52) U.S. Cl. .......................... 82/123; 82/70.1
(58) Field of Classification Search ............. 82/1.11, 82/70.1, 123, 157, 118; 29/561, 563; 83/76.8, 83/368, 881
See application file for complete search history.

(56) References Cited

U.S. PATENT DOCUMENTS

| 5,063,322 | A | * | 11/1991 | Sugita et al. ............ 310/341 |
| 5,291,812 | A | | 3/1994 | Yen et al. |
| 5,467,675 | A | | 11/1995 | Dow et al. |
| 6,040,653 | A | | 3/2000 | O'Neill |
| 6,170,367 | B1 | * | 1/2001 | Keller et al. ............ 82/1.11 |
| 6,237,452 | B1 | | 5/2001 | Ludwick et al. |
| 6,322,236 | B1 | | 11/2001 | Campbell et al. |
| 6,354,709 | B1 | | 3/2002 | Campbell et al. |
| 6,356,391 | B1 | | 3/2002 | Gardiner et al. |
| 6,560,026 | B2 | | 5/2003 | Gardiner et al. |
| 6,581,286 | B2 | | 6/2003 | Campbell et al. |
| 6,597,968 | B2 | | 7/2003 | Matsumoto et al. |
| 6,707,611 | B2 | | 3/2004 | Gardiner et al. |

(Continued)

FOREIGN PATENT DOCUMENTS

JP        63-306854        12/1988

(Continued)

OTHER PUBLICATIONS

UltraMill *Research@PEC,NCSU*, "Vibration Assisted Machining: Ultramill," North Carolina State University Precision Engineering Center, Raleigh, NC 27695, [http://airy.pec.ncsu.edu/PEC/research/projects/ultramill/index.html], Spring 2000, pp. 2.

(Continued)

*Primary Examiner*—Willmon Fridie, Jr.
(74) *Attorney, Agent, or Firm*—Lance L. Vietzke

(57) ABSTRACT

A cutting tool assembly having a tool post capable of lateral movement along a work piece to be cut and an actuator with a tool tip. The actuator provides for variable control of the movement of the tool tip in a z-direction laterally along the work piece, while maintaining the tool tip at a substantially constant position in an x-direction into the work piece, for use in making microstructures in the work piece.

20 Claims, 4 Drawing Sheets

U.S. PATENT DOCUMENTS

| | | |
|---|---|---|
| 6,811,274 B2 | 11/2004 | Olczak |
| 6,814,113 B1 * | 11/2004 | Daniels ................. 144/351 |
| 6,844,950 B2 | 1/2005 | Ja Chisholm et al. |
| 6,845,212 B2 | 1/2005 | Gardiner et al. |
| 6,862,141 B2 | 3/2005 | Olczak |
| 6,909,482 B2 | 6/2005 | Olczak |
| 6,925,915 B1 | 8/2005 | Claesson et al. |
| 6,945,099 B1 * | 9/2005 | Su et al. ................ 73/105 |
| 6,951,400 B2 | 10/2005 | Chisholm et al. |
| 6,952,627 B2 | 10/2005 | Olczak et al. |
| 7,089,836 B2 * | 8/2006 | Kato et al. ............ 82/1.11 |
| 7,101,694 B2 * | 9/2006 | Hirokawa et al. ....... 435/189 |
| 2002/0035231 A1 | 3/2002 | Whitehouse et al. |
| 2003/0108710 A1 | 6/2003 | Coyle et al. |
| 2003/0112521 A1 | 6/2003 | Gardiner et al. |
| 2004/0035266 A1 | 2/2004 | Montesanti et al. |
| 2004/0045419 A1 | 3/2004 | Bryan et al. |
| 2004/0109663 A1 | 6/2004 | Olczak |

FOREIGN PATENT DOCUMENTS

| | | |
|---|---|---|
| JP | 08-174320 | 7/1996 |
| JP | 9-275689 | 10/1997 |
| JP | 10-118888 | 5/1998 |
| JP | 2004098230 A | 4/2004 |
| JP | 2005-014169 | 1/2005 |
| KR | 2004096676 A | 9/2005 |
| WO | WO 97/48521 | 12/1997 |
| WO | WO 00/25963 | 5/2000 |
| WO | WO 00/50201 | 8/2000 |
| WO | WO 02/06005 A1 | 1/2002 |
| WO | WO 02/37168 A2 | 5/2002 |
| WO | WO 02/037168 A3 | 5/2002 |
| WO | WO 03/086688 A1 | 10/2003 |
| WO | WO 2005/043266 A2 | 5/2005 |
| WO | WO 2005/043266 A3 | 5/2005 |

OTHER PUBLICATIONS

Edward M. Trent & Paul K. Wright, *Metal Cutting*, 4th ed., Butterworth, Heinemann, 2000, pp. 258-260.

Zhang Jin-Hua, *Theory and Technique of Precision Cutting*, Pergamon Press, 1991, Chap. 2, "Nature of Cutting Force Variation in Precision Cutting," pp. 18-31.

M. K. Krueger, S. C. Yoon, D. Gong, S. B. McSpadden Jr., L. J. O'Rourke, R. J. Parten, "New Technology in Metalworking Fluids and Grinding Wheels Achieves Tenfold Improvement in Grinding Performance," Coolants/Lubricants for Metal Cutting and Grinding Conference, Chicago, Illinois, Milacron, Inc. and Oak Ridge National Laboratory, Jun. 7, 2000, pp. 15.

* cited by examiner

CUTTING TOOL HAVING VARIABLE MOVEMENT IN A Z-DIRECTION LATERALLY ALONG A WORK PIECE FOR MAKING MICROSTRUCTURES

REFERENCE TO RELATED APPLICATIONS

The present application is related to U.S. patent applications Ser. Nos. 11/274,723, 11/273,875, and 11/273,884, all of which were filed Nov. 15, 2005 and are incorporated herein by reference.

FIELD OF INVENTION

The present invention relates to diamond machining of microreplication tools used in creating microreplicated structures.

BACKGROUND

Machining techniques can be used to create a wide variety of work pieces such as microreplication tools. Microreplication tools are commonly used for extrusion processes, injection molding processes, embossing processes, casting processes, or the like, to create microreplicated structures. The microreplicated structures may comprise optical films, abrasive films, adhesive films, mechanical fasteners having self-mating profiles, or any molded or extruded parts having microreplicated features of relatively small dimensions, such as dimensions less than approximately 1000 microns.

The microstructures can also be made by various other methods. For example, the structure of the master tool can be transferred on other media, such as to a belt or web of polymeric material, by a cast and cure process from the master tool to form a production tool; this production tool is then used to make the microreplicated structure. Other methods such as electroforming can be used to copy the master tool. Another alternate method to make a light directing film is to directly cut or machine a transparent material to form the appropriate structures.

Other techniques include chemical etching, bead blasting, or other stochastic surface modification techniques. However, those techniques are typically not capable of forming the sharp, precise microstructures, and the breadth of features, desired to obtain the appropriate light diffusion characteristic achieved with a cutting tool using the methods of the present invention. In particular, these methods are not capable of producing highly accurate, repeating structures because of the inherent impreciseness and unrepeatability associated with chemical etching, bead blasting, and other stochastic surface modification techniques.

SUMMARY OF INVENTION

A first cutting tool assembly includes a tool post and an actuator configured for attachment to the tool post and for electrical communication with a controller. A tool tip attached to the actuator is mounted for movement with respect to a work piece to be cut. The actuator provides for variable control of the movement of the tool tip in a z-direction laterally along the work piece, while maintaining the tool tip at a substantially constant position in an x-direction into the work piece, for use in selectively cutting the work piece.

A second cutting tool assembly includes a tool post capable of lateral movement along a work piece to be cut and an actuator configured for attachment to the tool post and for electrical communication with a controller, the actuator including a piezoelectric stack. A tool tip attached to the piezoelectric stack is mounted for movement with respect to the work piece to be cut. The actuator provides for variable control of the movement of the tool tip in a z-direction laterally along the work piece, while maintaining the tool tip at a substantially constant position in an x-direction into the work piece, for use in selectively cutting the work piece in order to make microstructures in the work piece.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Cutting Tool System

General diamond turning techniques are described in PCT Published Application WO 00/48037, incorporated herein by reference as if fully set forth. The apparatus used in methods and for making optical films or other films can include a fast servo tool. As disclosed in WO 00/48037, a fast tool servo (FTS) is a solid state piezoelectric (PZT) device, referred to as a PZT stack, which rapidly adjusts the position of a cutting tool attached to the PZT stack. The FTS allows for highly precise and high speed movement of the cutting tool in directions within a coordinate system as further described below.

Figure 1:
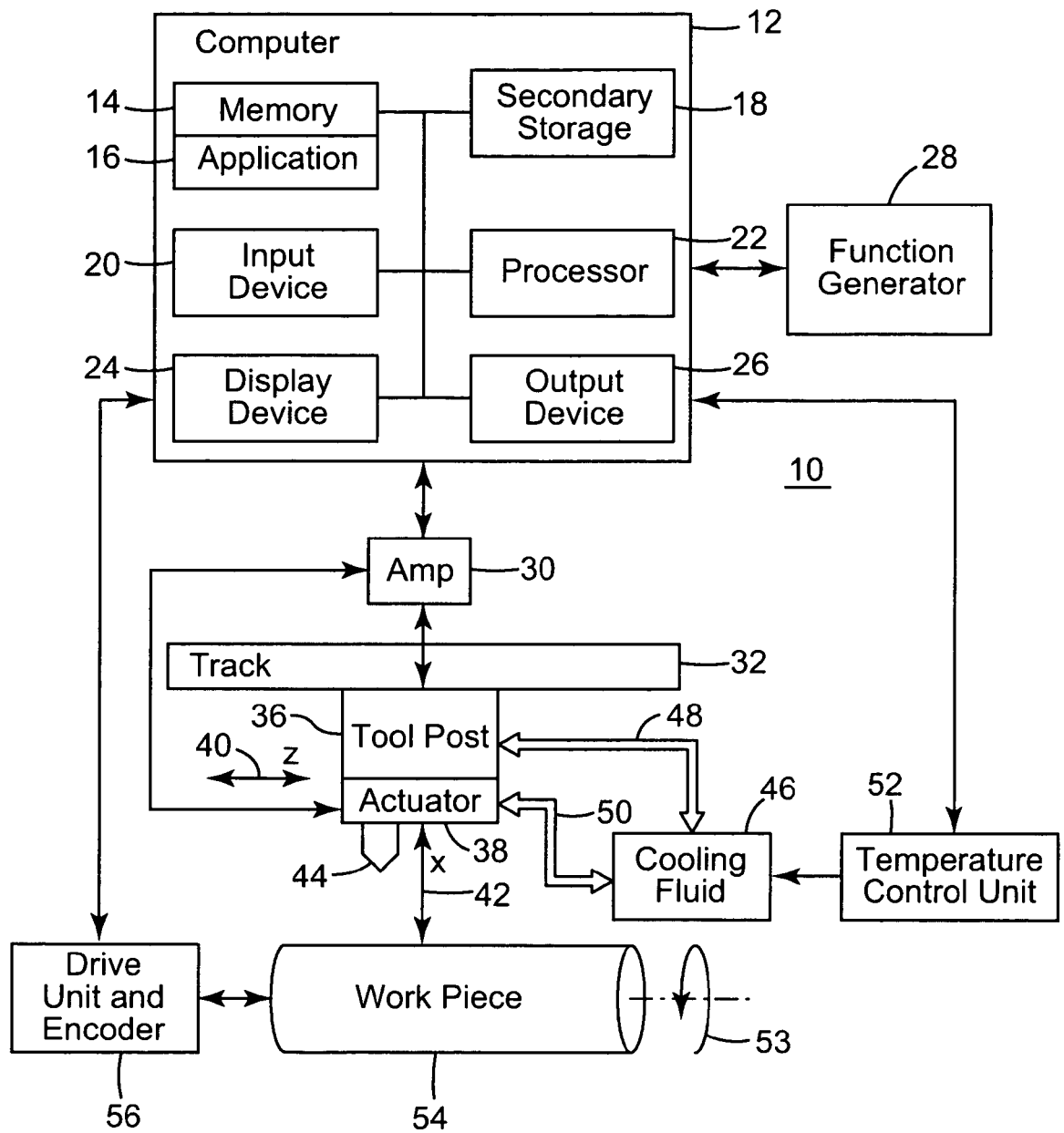
FIG. 1 is a diagram of a cutting tool system for making microstructures in a work piece.

FIG. 1 is a diagram of a cutting tool system 10 for making microstructures in a work piece. Microstructures can include any type, shape, and dimension of structures on, indenting into, or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). These dimensions are provided for illustrative purposes only, and microstructures made using the actuators and system described in the present specification can have any dimension within the range capable of being tooled using the system.

System 10 is controlled by a computer 12. Computer 12 has, for example, the following components: a memory 14 storing one or more applications 16; a secondary storage 18 providing for non-volatile storage of information; an input device 20 for receiving information or commands; a processor 22 for executing applications stored in memory 16 or secondary storage 18, or received from another source; a display device 24 for outputting a visual display of information; and an output device 26 for outputting information in other forms such as speakers for audio information or a printer for a hardcopy of information.

The cutting of a work piece 54 is performed by a tool tip 44. An actuator 38 controls movement of tool tip 44 as work piece 54 is rotated by a drive unit and encoder 56, such as an electric motor controlled by computer 12. In this example, work piece 54 is shown in roll form such as a hard copper roll; however, it can be implemented in planar form and make use of other materials for machining. For example, the work piece can be alternatively implemented with aluminum, nickel, steel, or plastics (e.g., acrylics). The particular material to be used may depend, for example, upon a particular desired application such as various films made using the machined work piece. Actuator 38, and the actuators described below, can be implemented with stainless steel, for example, or other materials.

Actuator 38 is removably connected to a tool post 36, which is in turn located on a track 32. The tool post 36 and actuator 38 are configured on track 32 to move in both an x-direction and a z-direction as shown by arrows 40 and 42. Computer 12 is in electrical connection with tool post 36 and actuator 38 via one or more amplifiers 30. When functioning as a controller, computer 12 controls movement of tool post 36 along track 32 and movement of tool tip 44 via actuator 38 for machining work piece 54. If an actuator has multiple PZT stacks, it can use separate amplifiers to independently control each PZT stack for use in independently controlling movement of a tool tip attached to the stacks. Computer 12 can make use of a function generator 28 in order to provide waveforms to actuator 38 in order to machine various microstructures in work piece 54, as further explained below.

The machining of work piece 54 is accomplished by coordinated movements of various components. In particular, the system, under control of computer 12, can coordinate and control movement of actuator 38, via movement of tool post 36, along with movement of the work piece in the c-direction and movement of tool tip 44 in one or more of the x-direction, y-direction, and z-direction, those coordinates being explained below. The system typically moves tool post 36 at a constant speed in the z-direction, although a varying speed may be used. The movements of tool post 36 and tool tip 44 are typically synchronized with the movement of work piece 54 in the c-direction (rotational movement as represented by line 53). All of these movements can be controlled using, for example, numerical control techniques or a numerical controller (NC) implemented in software, firmware, or a combination in computer 12.

Work piece 54, after having been machined, can be used to make films having the corresponding microstructures for use in a variety of applications. Examples of those films include optical films, friction control films, and microfasteners or other mechanical microstructured components. The films are typically made using a coating process in which a material in a viscous state is applied to the work piece, allowed to at least partially cure, and then removed. The film composed of the cured material will have substantially the opposite structures than those in the work piece. For example, an indentation in the work piece results in a protrusion in the resulting film.

Cooling fluid 46 is used to control the temperature of tool post 36 and actuator 38 via lines 48 and 50. A temperature control unit 52 can maintain a substantially constant temperature of the cooling fluid as it is circulated through tool post 36 and actuator 38. Temperature control unit 52 can be implemented with any device for providing temperature control of a fluid. The cooling fluid can be implemented with an oil product, for example a low viscosity oil. The temperature control unit 52 and reservoir for cooling fluid 46 can include pumps to circulate the fluid through tool post 36 and actuator 38, and they also typically include a refrigeration system to remove heat from the fluid in order to maintain it at a substantially constant temperature. Refrigeration and pump systems to circulate and provide temperature control of a fluid are known in the art. In certain embodiments, the cooling fluid can also be applied to work piece 54 in order to maintain a substantially constant surface temperature of the material to be machined in the work piece.

Figure 2:
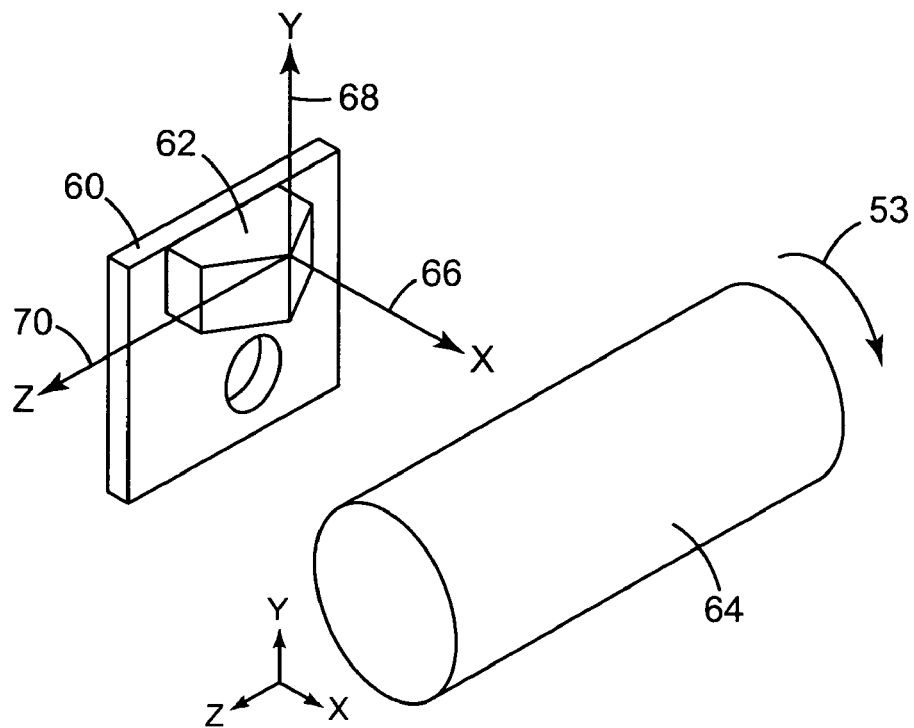
FIG. 2 is a diagram illustrating a coordinate system for a cutting tool.

FIG. 2 is a diagram illustrating a coordinate system for a cutting tool such as system 10. The coordinate system is shown as movement of a tool tip 62 with respect to a work piece 64. Tool tip 62 may correspond with tool tip 44 and is typically attached to a carrier 60, which is attached to an actuator. The coordinate system, in this exemplary embodiment, includes an x-direction 66, a y-direction 68, and a z-direction 70. The x-direction 66 refers to movement in a direction substantially perpendicular to work piece 64. The y-direction 68 refers to movement in a direction transversely across work piece 64 such as in a direction substantially parallel to a plane of rotation of work piece 64. The z-direction 70 refers to movement in a direction laterally along work piece 64 such as in a direction substantially perpendicular to a plane of rotation of work piece 64. The rotation of the work piece is referred to as the c-direction, as also shown in FIG. 1. If the work piece is implemented in planar form, as opposed to roll form, then the y-direction and z-direction refer to movement in mutually orthogonal directions across the work piece in directions substantially perpendicular to the x-direction.

The system 10 can be used for high precision, high speed machining. This type of machining must account for a variety of parameters, such as the coordinated speeds of the components and the work piece material. It typically must take into consideration the specific energy for a given volume of metal to be machined, for example, along with the thermal stability and properties of the work piece material. Cutting parameters relating to machining are described in the following references, all of which are incorporated herein by reference as if fully set forth: Machining Data Handbook, Library of Congress Catalog Card No. 66-60051, Second Edition (1972); Edward Trent and Paul Wright, Metal Cutting, Fourth Edition, Butterworth-Heinemann, ISBN 0-7506-7069-X (2000); Zhang Jin-Hua, Theory and Technique of Precision Cutting, Pergamon Press, ISBN 0-08-035891-8 (1991); and M. K. Krueger et al., New Technology in Metalworking Fluids and Grinding Wheels Achieves Tenfold Improvement in Grinding Performance, Coolant/Lubricants for Metal Cutting and Grinding Conference, Chicago, Ill., U.S.A., Jun. 7, 2000.

PZT Stack

Figure 3:
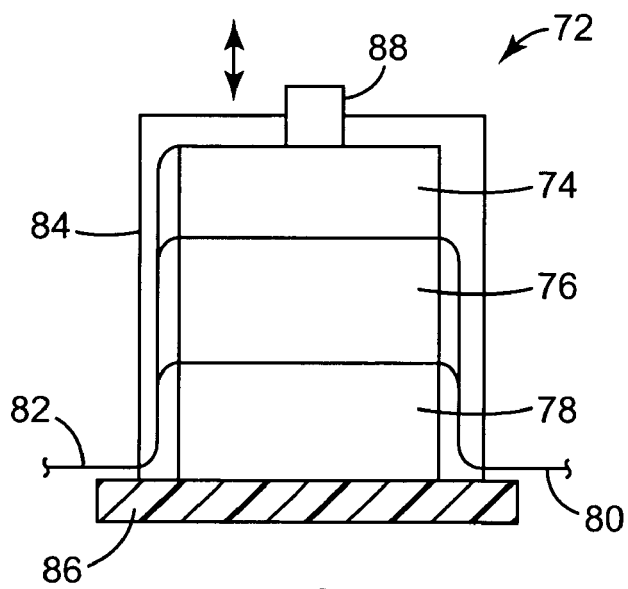
FIG. 3 is a diagram of an exemplary PZT stack for use in a cutting tool.

FIG. 3 is a diagram of an exemplary PZT stack 72 for use in a cutting tool. A PZT stack is used to provide movement of a tool tip connected to it and operates according to the PZT effect, which is known in the art. According to the PZT effect, an electric field applied to certain types of materials causes expansion of them along one axis and contraction along another axis. A PZT stack typically includes a plurality of materials 74, 76, and 78 enclosed within a casing 84 and mounted on a base plate 86. The materials in this exemplary embodiment are implemented with a ceramic material subject to the PZT effect. Three disks 74, 76, and 78 are shown for exemplary purposes only and any number of disks or other materials, and any type of shapes of them, can be used based upon, for example, requirements of particular embodiments. A post 88 is adhered to the disks and protrudes from casing 84. The disks can be implemented with any PZT material such as for example, a barium titanate, lead zirconate, or lead titanate material mixed, pressed, based, and sintered. One such PZT material is available from Kinetic Ceramics, Inc., 26240 Industrial Blvd., Hayward, Calif. 94545, U.S.A. The disks can also be implemented with a magnetostrictive material, for example.

Electrical connections to the disks 74, 76, and 78, as represented by lines 80 and 82, provide electrical fields to them in order to provide for movement of post 88. Due to the PZT effect and based upon the type of electric field applied, precise and small movement of post 88, such as movement within several microns, can be accomplished. Also, the end of PZT stack 72 having post 88 can be mounted against one or more Belleville washers, which provides for preloading of the PZT stack. The Belleville washers have some flexibility to permit movement of post 88 and a tool tip attached to it. Each PZT stack in the actuators described below can also incorporate Belleville washers for preloading or, alternatively, any device mounted against each PZT stack for preloading of it.

Fast Z Actuator

Figure 4A:
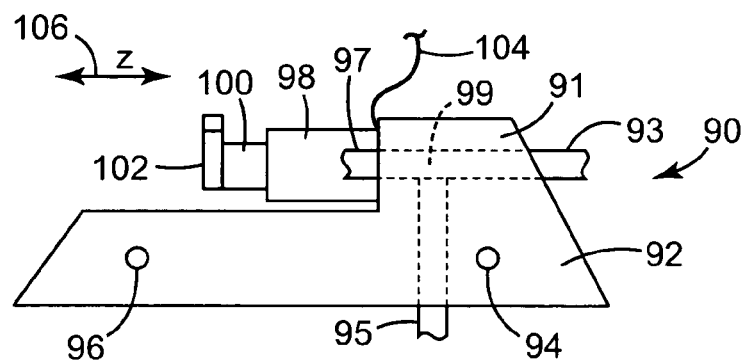
FIG. 4A is a top view of a fast Z actuator for use in a cutting tool.
Figure 4B:
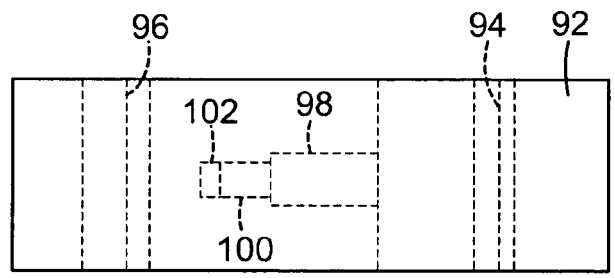
FIG. 4B is a back view of a fast Z actuator.
Figure 4C:
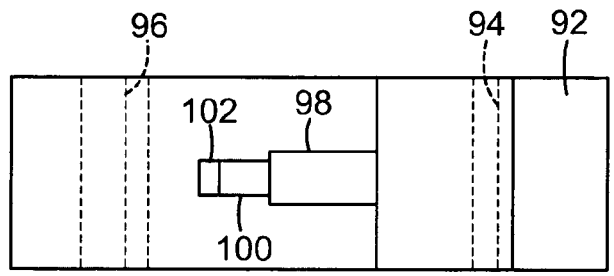
FIG. 4C is a front view of a fast Z actuator.
Figure 4D:
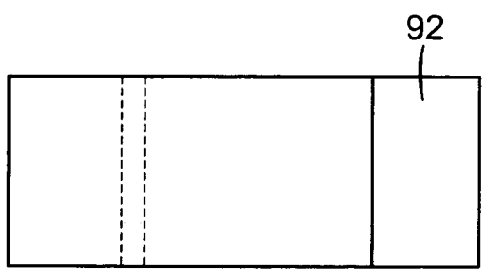
FIGS. 4D and 4E are side views of a fast Z actuator.
Figure 4E:
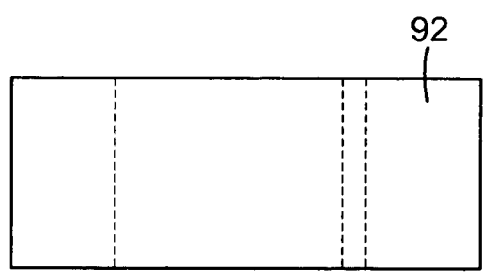
Figure 4F:
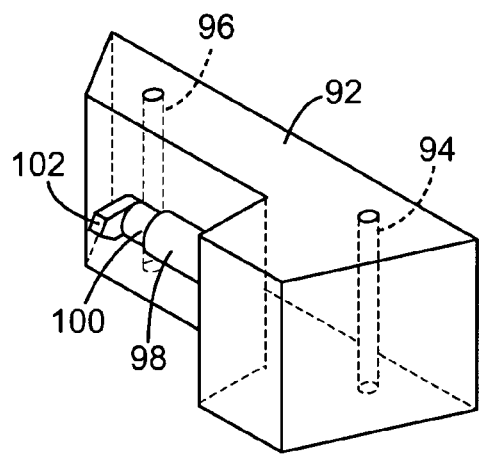
FIG. 4F is a perspective view of a fast Z actuator.

FIGS. 4A-4F are views of an exemplary fast Z actuator 90. The term "fast Z actuator" refers to any type of actuator or other device that provides for movement of a tool tip in substantially a z-direction for use in machining a work piece. FIG. 4A is a top view of fast Z actuator 90. FIG. 4B is a back view of fast Z actuator 90. FIG. 4C is a front view of fast Z actuator 90. FIGS. 4D and 4E are side views of fast Z actuator 90. FIG. 4F is a perspective view of fast Z actuator 90. Some details of fast Z actuator 90 in FIGS. 4B-4F have been removed for clarity.

As shown in FIGS. 4A-4F, fast Z actuator 90 includes a main body 92 having a mounting section 91. A PZT stack 98 is secured between mounting section 91 and a plate 100 using a fastener, for example. Plate 100 is attached to a tool tip 102 connected transversely to PZT stack 98 such that activation of PZT stack 98 causes movement of tool tip 102 in a z-direction, as represented by arrows 106. PZT stack 98 can be implemented with the exemplary PZT stack 72 shown in FIG. 3. Plate 100 can be implemented with one or more Belleville washers, for example, for use in preloading PZT stack 98.

Main body 92 also includes two pairs of apertures 94 and 96 for use in mounting it to tool post 36, such as via bolts, for machining work piece 54 under control of computer 12. An electrical connection 104 provides for transmitting signals to PZT stack 98 for control of it. As shown in FIG. 4A, main body 92 can be temperature controlled by transmitting a cooling fluid, as described above, into at least one of ports 93, 95, and 97, through aperture 99, and out at least one of ports 93, 95, and 97 (not used as an input port). Aperture 99 for transmitting the cooling fluid through main body 92 can include any particular shape or configuration, and any number of input and output ports may also be used.

Figure 5A:
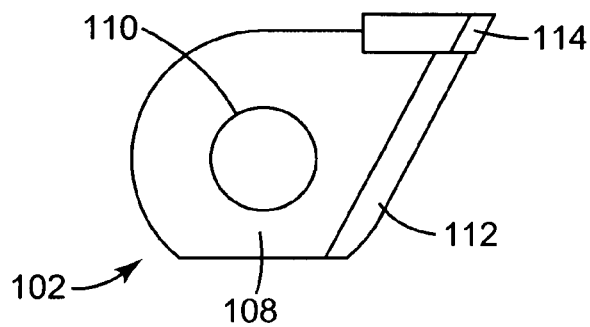
FIG. 5A is a side view of a tool tip for use with a fast Z actuator.
Figure 5B:
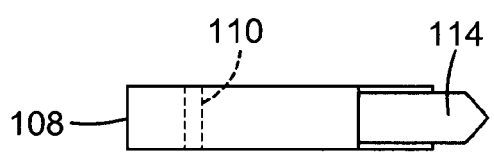
FIG. 5B is a top view of a tool tip.
Figure 5C:
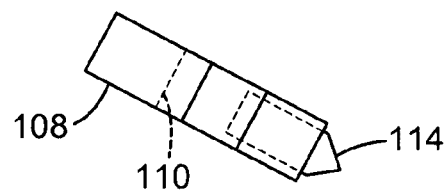
FIG. 5C is a bottom view of a tool tip.
Figure 5D:
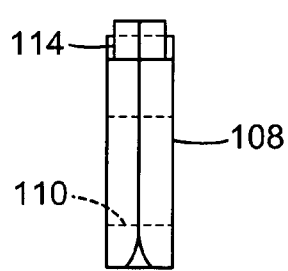
FIG. 5D is a front view of a tool tip.

FIGS. 5A-5D are views providing more detail of tool tip 102. FIG. 5A is a side view of tool tip 102. FIG. 5B is a top view of tool tip 102. FIG. 5C is a bottom view of tool tip 102. FIG. 5D is a front view of tool tip 102. As shown in FIGS. 5A-5D, tool tip 102 includes a portion 108 having an aperture 110 for use in mounting it to plate 100. Tool tip 102 also has front tapered section 112 holding a cutting portion 114. Portion 108 can be implemented with, for example, one or more of the following materials: sintered carbide, silicon nitride, silicon carbide, steel, or titanium. The material for portion 108 preferably is stiff and has a low mass. Cutting portion 114 can be implemented with, for example, a diamond slab, and it can be secured to portion 108 such as by use of an adhesive, brazing, soldering, or in other ways.

Figure 6:
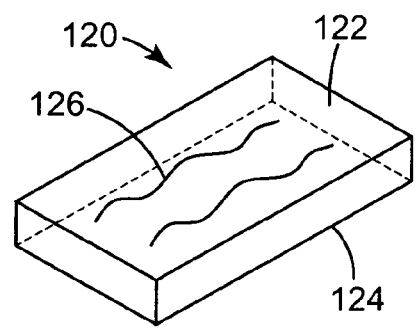
FIG. 6 is a diagram conceptually illustrating microstructures that can be made using the cutting tool system having a fast Z actuator.

FIG. 6 is a diagram conceptually illustrating microstructures that can be made using the cutting tool system having a fast Z actuator. As shown in FIG. 6, an article 120 includes a top surface 122 and a bottom surface 124. Top surface 122 includes microstructures as represented by lines 126, and those microstructures can be made using the actuators described above to machine a work piece and then using that work piece to make a film or article using a coating technique. In some embodiments, actuator 98 can operate at 20-30 kHz for making the microstructures, although other frequencies are possible.

While the present invention has been described in connection with an exemplary embodiment, it will be understood that many modifications will be readily apparent to those skilled in the art, and this application is intended to cover any adaptations or variations thereof. For example, various types of materials for the tool post, actuator, and tool tip, and configurations of those components, may be used without departing from the scope of the invention. This invention should be limited only by the claims and equivalents thereof.

The invention claimed is:

1. A fast Z actuator for use in machining a work piece, comprising:
    a main body having a back side, a front side, and a mounting section on the front side;
    a piezoelectric stack secured and preloaded on the mounting section such that the piezoelectric stack extends substantially parallel to the front side of the main body; and
    a tool tip connected to the piezoelectric stack, wherein the tool tip includes a cutting portion extending substantially perpendicular to the piezoelectric stack,
    wherein the piezoelectric stack moves the tool tip in a z-direction substantially parallel a surface of the work piece to be machined.

2. The actuator of claim 1, wherein the tool tip includes an aperture for mounting the tool tip to the piezoelectric stack.

3. The actuator of claim 1, wherein the tool tip includes a tapered front section for holding the cutting portion.

4. The actuator of claim 1, further including a plate attached between the piezoelectric stack and the tool tip for the preloading of the piezoelectric stack.

5. The actuator of claim 1, wherein the piezoelectric stack is comprised of one of the following materials: barium titanate; lead zirconate; lead titanate; or a magnetostrictive material.

6. The actuator of claim 1, wherein the main body includes an aperture having a port for receiving a cooling fluid.

7. The actuator of claim 4, wherein the plate comprises a Belleville washer.

8. The actuator of claim 1, wherein the paddle is comprised of titanium.

9. The actuator of claim 1, wherein the main body is comprised of stainless steel.

10. The actuator of claim 1, wherein the main body is configured to be removably attached to a tool post.

11. An apparatus for machining a cylindrical work piece, comprising:
   a substantially cylindrical work piece mounted for rotational movement;
   a drive unit connected to the work piece for rotating the work piece;
   a tool post mounted on a track for movement substantially parallel to a surface of the work piece to be machined;
   an actuator mounted on the tool post, the actuator comprising:
      a main body having a back side, a front side, and a mounting section on the front side;
      a piezoelectric stack secured and preloaded on the mounting section such that the piezoelectric stack extends substantially parallel to the front side of the main body; and
      a tool tip connected to the piezoelectric stack, wherein the tool tip includes a cutting portion extending substantially perpendicular to the piezoelectric stack,
      wherein the piezoelectric stack moves the tool tip in a z-direction substantially parallel a surface of the work piece to be machined; and
   a controller, connected to the drive unit and the actuator, for controlling the rotation of the work piece via the drive unit and the movement of the tool tip via the piezoelectric stack.

12. The apparatus of claim 11, wherein the tool tip includes an aperture for mounting the tool tip to the piezoelectric stack.

13. The apparatus of claim 11, wherein the tool tip includes a tapered front section for holding the cutting portion.

14. The apparatus of claim 11, further including a plate attached between the piezoelectric stack and the tool tip for the preloading of the piezoelectric stack.

15. The apparatus of claim 11, wherein the piezoelectric stack is comprised of one of the following materials: barium titanate; lead zirconate; lead titanate; or a magnetostrictive material.

16. The apparatus of claim 11, wherein the main body includes an aperture having a port for receiving a cooling fluid.

17. The apparatus of claim 14, wherein the plate comprises a Belleville washer.

18. The apparatus of claim 1, wherein the paddle is comprised of titanium.

19. The apparatus of claim 1, wherein the main body is comprised of stainless steel.

20. The apparatus of claim 16, further comprising a cooling fluid reservoir connected to the port for delivering the cooling fluid to the aperture.

* * * * *

UNITED STATES PATENT AND TRADEMARK OFFICE
CERTIFICATE OF CORRECTION

PATENT NO. : 7,350,442 B2  Page 1 of 1
APPLICATION NO. : 11/273981
DATED : April 1, 2008
INVENTOR(S) : Dale L. Ehnes It is certified that error appears in the above-identified patent and that said Letters Patent is hereby corrected as shown below:

Column 8,
Line 23, delete "claim 1," and insert -- claim 11, --, therefor.
Line 25, delete "claim 1," and insert -- claim 11, --, therefor.

Signed and Sealed this

Nineteenth Day of August, 2008

JON W. DUDAS
*Director of the United States Patent and Trademark Office*